(No Model.)
C. W. ISBELL.
GEARING.
No. 391,535. Patented Oct. 23, 1888.
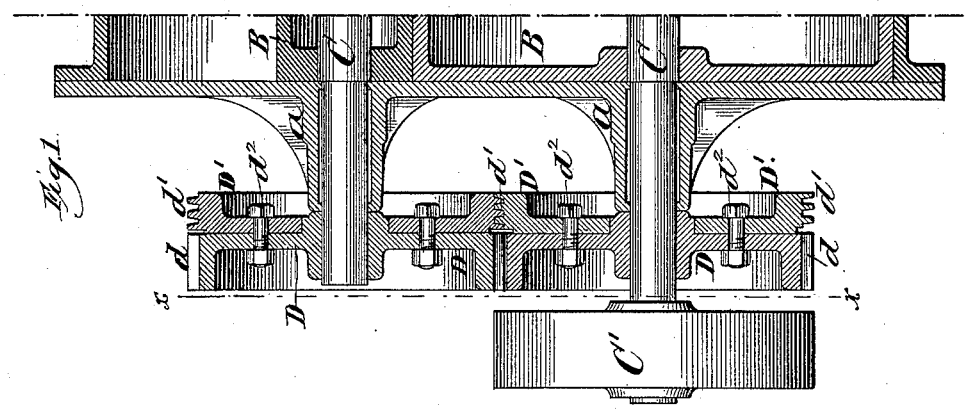
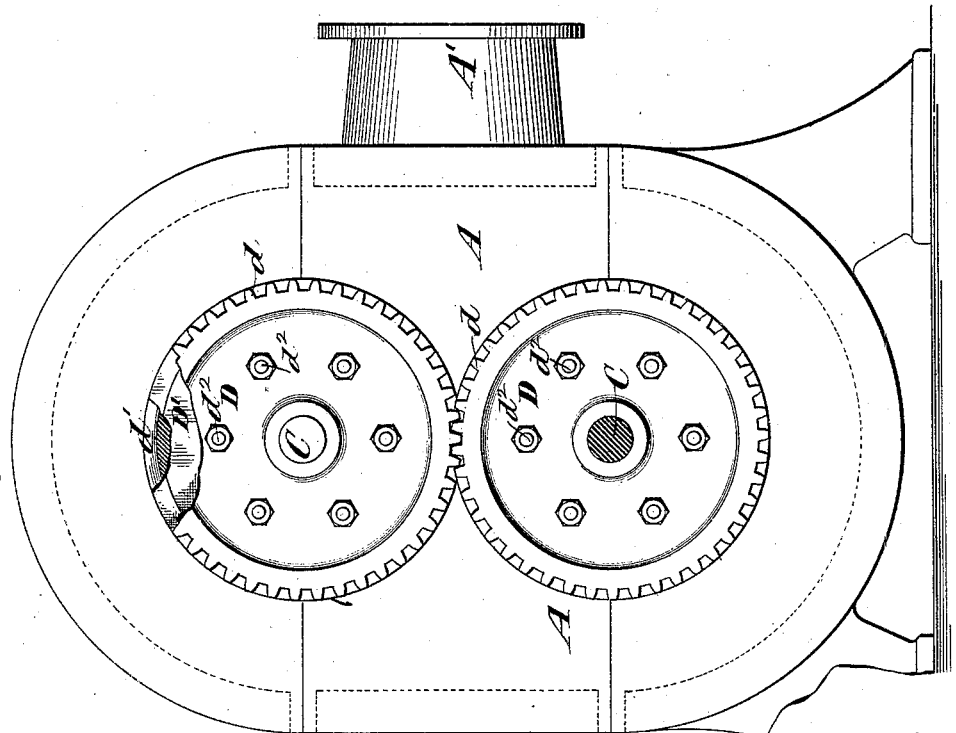
Witnesses:
O. L. Sundgren.
Joseph W. Roe.
Inventor:
Chas. W. Isbell,
by his attys
Brown & Hall.

UNITED STATES PATENT OFFICE.

CHARLES W. ISBELL, OF NEW YORK, N. Y.

GEARING.

SPECIFICATION forming part of Letters Patent No. 391,535, dated October 23, 1888.

Application filed November 30, 1887. Serial No. 256,504. (No model.)

*To all whom it may concern:*

Be it known that I, CHARLES W. ISBELL, of the city and county of New York, in the State of New York, have invented a new and useful Improvement in Gearing for Shafts, of which the following is a specification.

My invention may be employed in any machinery where it is desired to gear together two shafts, so that they will rotate simultaneously or in unison, and as one of the applications which may be made of my improved gearing I would refer to rotary blowers or exhausters, which comprise two parallel shafts having upon them interengaging rotary pistons.

While ordinary spur-toothed gearing has the inherent disadvantage of being noisy and permitting backlash, it prevents two shafts which are connected by it from varying in their position relatively to each other; or, in other words, prevents one shaft from turning without a corresponding turning of the other shaft. Friction-gearing, as ordinarily used, has the disadvantage that the frictionally-engaging surfaces are liable to slip one on the other, thus permitting one shaft to turn without turning the other. I have discovered that by combining these two kinds of gearing—that is, by connecting the shafts by wheels having both spur-toothed and frictionally-engaging surfaces—the disadvantages of each kind of gearing as used alone are counteracted or neutralized, and that the two shafts are rotated positively and yet with comparatively little noise from the gearing and without backlash.

The invention therefore consists in the combination, with two shafts designed to rotate in unison or simultaneously, of gearing connecting the shafts and composed of wheels having both spur-toothed and circumferentially ribbed and grooved frictionally-engaging surfaces, the spur-toothed and the frictionally-engaging surfaces on the same shaft being of the same pitch diameter, and the spur-teeth serving to prevent slip between the frictionally-engaging surfaces, and the latter serving to reduce the noise and prevent the backlash which is inherent in spur-toothed gearing.

In the accompanying drawings, Figure 1 is an axial section of portions of a blower-casing and its two shafts, with their rotary pistons geared together by my improved gearing; and Fig. 2 is an end view, mainly upon the plane of the dotted line *x x*, Fig. 1, one shaft being shown in section and the driving-pulley removed, and the gear-wheels being partly broken away or in section.

Similar letters of reference designate corresponding parts in both figures.

A designates the casing of the blower or exhauster, having at one side a nozzle or opening, A', for the attachment of an inlet-pipe, and having on the other side a similar nozzle or opening, $A^2$, for the attachment of an outlet-pipe. Within the casing are fitted two rotary pistons, B, portions only of which are shown in Fig. 1, and which may be of any construction ordinarily used or suitable for rotary blowers or exhausters or rotary pumps. The pistons are constructed with radially-projecting portions and corresponding recesses alternating with each other, and equally disposed around their circumference and engaging with each other, so as to practically close the opening between them in a direction from the inlet A' to the outlet $A^2$, and vice versa.

The pistons B are fixed upon shafts C, which are fitted to suitable bearings, *a*, upon the heads of the casing A, and these shafts C are geared together, so that they will rotate in unison or simultaneously. The shafts C of a blower or exhauster of this character are usually geared together, so as to insure their synchronous rotation when power is applied to one of them, as by a belt passing around a pulley, C', upon the lower shaft, and the two shafts C (here represented as the shafts of a blower or exhauster) may be considered as two corresponding shafts in any class of machinery which it is desired to gear together, so as to insure their simultaneous rotation.

The wheels whereby the shafts are geared together according to my invention comprise a circle of spur-teeth, *d*, and in addition to these positively-engaging portions frictionally-engaging portions *d'*. In the present example of my invention the positively-engaging toothed portions *d* and the frictionally-engaging portions *d'* are arranged close together side by side, and are here shown as formed by a spur-toothed wheel, D, secured upon the shaft, and an annular plate or disk-like portion, D', secured to the side of said wheel by bolts $d^2$ and constructed with a frictionally-engaging portion, $d'$. I have here shown this frictionally-engaging portion $d'$ as formed with circumferential V-shaped grooves and teeth which engage with those of the opposite and corresponding wheel in a well-understood manner, as in ordinary friction gearing.

From the above description it will be readily understood that owing to the engagement of the spur-toothed portions $d$ of the wheels the relative positions of the two shafts will remain unchanged; or, in other words, it is impossible for one shaft to turn without the turning of the other, and, owing to the frictionally-engaging portions $d'$ of the wheels, they are enabled to operate with a smoothness which is impossible with ordinary spur toothed gearing and without any backlash and with less noise.

I am aware that spur-toothed gearing and gearing having frictionally-engaging surfaces are both well known individually, as are also the defects inherent to each. I am not, however, aware that they have been before combined in the manner described by me. When they are brought together, so as to connect the same shafts, a new combination is produced, and not a mere aggregation, because the operation of each kind of gearing is modified by the other kind. The frictionally-engaging surfaces $d'$ greatly reduce the clatter and noise incident to the operation of spur-gearing and entirely obviate the backlash which is always inherent in spur-gearing, and the engaging spur-toothed surfaces serve accurately to preserve the relation of the shafts C and the parts which they carry and prevent absolutely the slipping which is liable to occur with gearing having frictionally-engaging surfaces used alone.

My invention may be employed with great advantage for gearing together two shafts, one of which forms the crank-shaft of an engine or is coupled directly thereto. When ordinary spur-gears are used under such circumstances, they make such a rattling that the engine crank-shaft is not directly coupled to the shaft to be driven, but is arranged to transmit its power thereto by a belt. When my improved gearing is used to connect two shafts, one of them may be coupled directly to the crank-shaft of an engine and the machine operated smoothly and without objectionable noise.

I am aware of Patent No. 342,134, granted May 18, 1886, to George H. Reynolds, and I do not desire to include by my invention gearing of the kind shown in that patent. The gearing shown in that patent comprises two parallel series of spur-teeth upon each gear-wheel, and between the two series of spur-teeth the two wheels have smooth circumferential rolling surfaces. These rolling surfaces do not act to drive by friction, and such rolling surfaces are moreover not circumferentially ribbed and grooved, as are the wheels of my gearing.

I am also aware of Patent No. 260,532, granted July 4, 1882, and I do not desire to include in my invention anything shown in that patent. In that patent are shown a pair of rolls and friction-grooved and ribbed gearing, consisting of one wheel fast upon one roll-shaft and another wheel mounted to turn loosely upon a journal or support which is outside the roll-shaft and is independent of such shaft. The friction-wheel, which is mounted upon such journal, has also cast with it a smaller spur-pinion, which engages with an internal gear fast upon the roll-shaft. In this patent there are no two shafts which are geared directly together both by spur-toothed gear and by friction-gear, and in said patent the friction-gear and the spur-toothed gear are both independent links in the chain of gearing which is employed to connect the two rolls. According to my invention the spur-toothed surfaces and the circumferentially ribbed and grooved frictionally-engaging surfaces which are on the same shaft are of the same pitch diameter, and in this respect my gearing is fully distinguished from that set forth in Campbell's patent.

What I claim as my invention, and desire to secure by Letters Patent, is—

The combination, with two shafts designed to rotate in unison or simultaneously, of gearing connecting the shafts and composed of wheels having both spur-toothed and circumferentially ribbed and grooved frictionally-engaging surfaces, the spur-toothed and frictionally-engaging surfaces on the same shaft being of the same pitch diameter, the spur-teeth serving to prevent slip between the frictionally-engaging surfaces, and the latter surfaces serving to reduce the noise and prevent the backlash inherent in spur-toothed gearing, substantially as herein described.

CHAS. W. ISBELL.

Witnesses:
FREDK. HAYNES,
C. HALL.